(12) United States Patent
Magerramov et al.

(10) Patent No.: US 9,813,374 B1
(45) Date of Patent: Nov. 7, 2017

(54) AUTOMATED ALLOCATION USING SPARE IP ADDRESSES POOLS

(71) Applicant: Amazon Technologies, Inc., Seattle, WA (US)

(72) Inventors: Joseph E. Magerramov, Bellevue, WA (US); Sergey Kolosov, Redmond, WA (US); Carl Michael Carter-Schwendler, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 14/735,987

(22) Filed: Jun. 10, 2015

(51) Int. Cl.
*G06F 13/00* (2006.01)
*H04L 29/12* (2006.01)

(52) U.S. Cl.
CPC .................. *H04L 61/2007* (2013.01)

(58) Field of Classification Search
CPC . H04L 61/20; H04L 61/2007; H04L 61/2061; H04L 29/12207; H04L 29/12216; H04L 29/12283
USPC ................ 709/245, 226, 223, 224
See application file for complete search history.

(56) References Cited

U.S. PATENT DOCUMENTS

2005/0122946 A1* 6/2005 Won .................. H04L 29/12283
370/338

* cited by examiner

*Primary Examiner* — Kenneth R Coulter
(74) *Attorney, Agent, or Firm* — Klarquist Sparkman, LLP

(57) ABSTRACT

Techniques and solutions are provided for performing automated allocation of Internet Protocol (IP) addresses. For example, automated allocation of IP addresses can be performed by determining that remaining IP addresses in an available IP address pool are below a threshold value, obtaining a range of contiguous IP addresses from a common spare IP address pool, and allocating the range of contiguous IP addresses from the common spare IP address pool to the available IP address pool. The available IP address pool can then be used to allocate IP addresses to instances and/or services.

20 Claims, 8 Drawing Sheets

AUTOMATED ALLOCATION USING SPARE IP ADDRESSES POOLS

BACKGROUND

In order to communicate via the Internet, network devices are assigned Internet Protocol (IP) addresses. IP addresses are used to identify devices when sending and receiving traffic via the network.

Configuring network devices, such as server computers, with IP addresses is typically performed by a network administrator. However, manually configuring and maintaining IP address assignments can be time consuming and error prone. For example, a network administrator may have to manually manage a list of available IP addresses and manually maintain a sufficient number of IP addresses in the list for future assignments.

DETAILED DESCRIPTION

Overview

Figure 1:
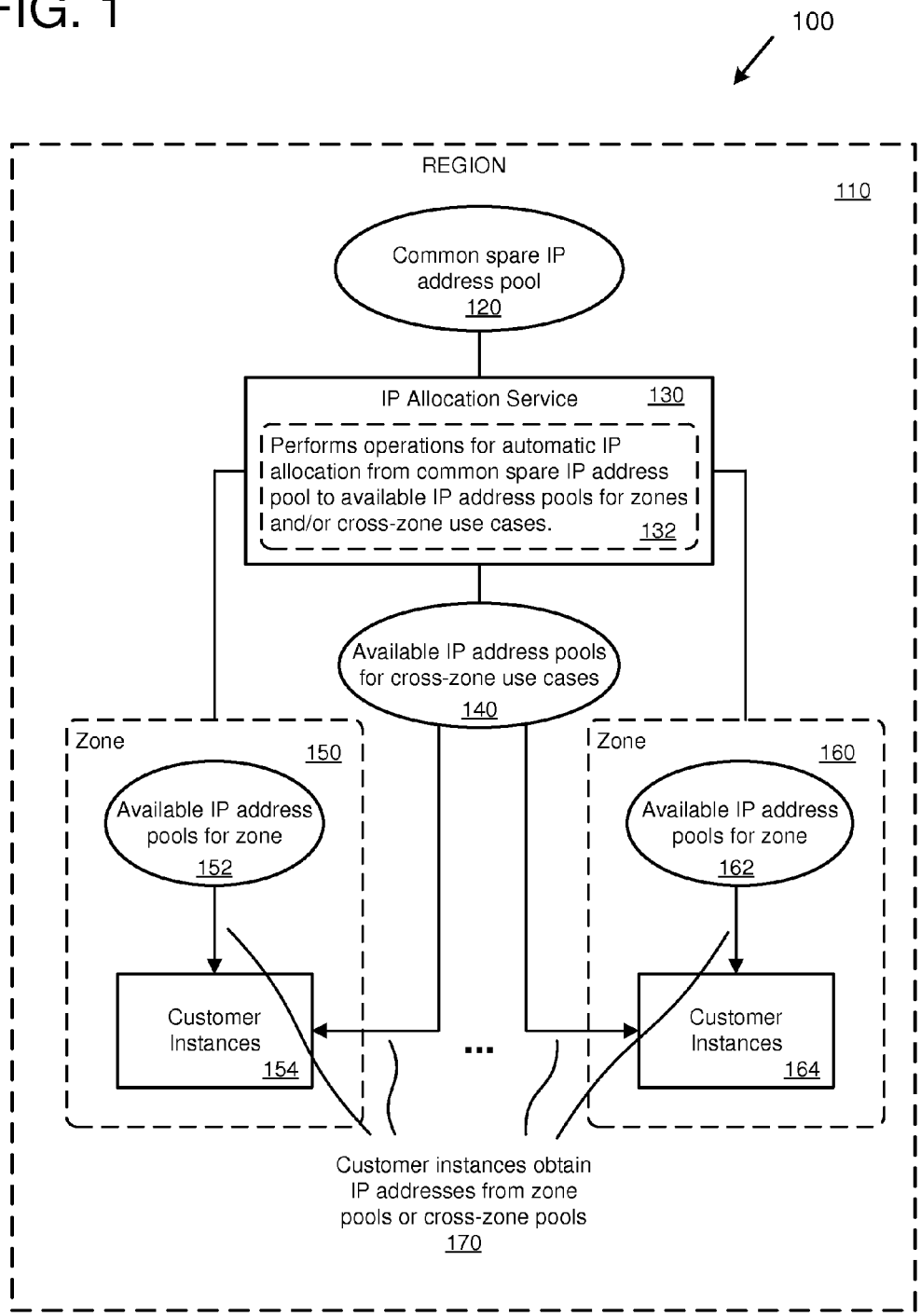
FIG. 1 is a diagram of an example environment supporting automated allocation of IP addresses within a region.

The following description is directed to techniques and solutions for performing automated allocation of Internet Protocol (IP) addresses to zones of a service provider environment. From there, the IP addresses can be further allocated to customer instances. A service provider may operate a service (e.g., a compute service, storage service, etc.) in multiple locations world-wide called zones. As described in more detail, zones can have some level of isolation from other zones and, in some embodiments, zones can be completely independent from each other in terms of power, networking, and other computing resources. For example, automated allocation of IP addresses can be performed by determining that remaining IP addresses in an available IP address pool (e.g., a customer-available IP address pool for a zone of the service provider environment) are below a threshold value, obtaining a range of contiguous IP addresses from a common spare IP address pool of the service provider, and allocating the range of contiguous IP addresses from the common spare IP address pool to the available IP address pool. The available IP address pool can then be used to allocate IP addresses to instances (e.g., virtual machine instances running within a cloud computing environment, which can also be called customer instances) and/or services.

In some implementations, a common spare IP address pool is used for allocating ranges of contiguous IP addresses within a geographical region of the service provider. For example, a geographical region of computing devices can be a collection of computer servers in a data center at a particular location (e.g., a city). The common spare IP address pool can provide ranges of contiguous IP addresses to a number of available IP address pools. In turn, the available IP address pools can provide IP addresses for allocation to devices and/or services in the geographical region when needed. For example, when a customer instance is launched in the geographical region, it can automatically obtain an IP address (or a number of IP addresses) from one of the available IP address pools in the geographical region.

In some implementations, IP address utilization within a geographical region is organized on the basis of zones and use cases. A zone represents a logical data center and may be mapped to one or more physical data centers including server computers on which virtual machine instances run. A zone may be associated with one or more available IP address pools that provide IP addresses for allocation to the instances (e.g., customer instances) and/or services associated with the zone. The available IP address pools associated with a particular zone may be general pools (e.g., providing IP addresses to any type of requesting instance or service of the zone) or use case pools. A use case available IP address pool provides IP addresses for allocation to instances and/or services associated with a particular use case. One example of a use case is an elastic IP use case. An available IP address pool associated with the elastic IP use case provides IP addresses for instances and/or services that use elastic IPs (e.g., IP addresses that can be re-assigned to different instances and/or services without being released back to the pool). Another example of a use case is a load balancer use cases. An available IP address pool associated with the load balancer use case provides IP addresses for instances and/or services that utilize a load balancer.

Available IP address pools that are not associated with a particular zone can also be provided. For example, available IP address pools for use cases can be provided across the zones of a region (e.g., called cross zone use cases). For example, instances and/or services of the various zones of a region can allocate IP addresses for a particular use case from the cross-zone use case available IP address pool.

The IP addresses that are available for allocation from the common spare IP address pool and the available IP address pools are public IP addresses that are routable via the Internet. For example, the service provider can obtain a block of contiguous IP addresses (e.g., a /16 block of IPv4 addresses, which contains 65,536 individual IP addresses) and add it to the common spare IP address pool serving a particular region. When available IP address pools for the particular zone runs low, ranges of contiguous IP address can be automatically allocated from the common spare IP address pool to the available IP address pools. For example, a /24 block of IPv4 addresses, which contains 256 individual IP addresses, can be automatically allocated from the common spare IP address pool to a particular available IP address pool. In some implementations, IPv6 addresses are used instead of, or in addition to, IPv4 addresses.

In some implementations, a global spare IP address pool provides ranges of contiguous IP addresses to one or more common spare IP address pools in one or more corresponding geographical regions. For example, when IP addresses in a particular common spare IP address pool fall below a threshold value, a range of contiguous IP addresses (e.g., a /12 block of IPv4 addresses) can be automatically allocated from the global spare IP address pool to the particular common spare IP address pool. For example, the service provider can maintain a global spare IP address pool that provides IP addresses for allocation to common spare IP address pools located in a number of different geographical regions (e.g., to a number of data centers in different locations).

In some implementations, automated allocation of IP addresses is performed on the basis of contiguous ranges of IP addresses. For example, a contiguous range of IP addresses is allocated from a common spare IP address pool to an available IP address pool when the available IP address pool runs low (e.g., below a threshold value of available IP addresses in the pool). In some implementations, automated allocation of IP addresses can be performed on the basis of non-contiguous ranges (e.g., collections of IP addresses that are not contiguous and/or individual IP addresses).

The techniques described herein provide advantages over manual IP management solutions. For example, with manual management of free IP addresses, an administrator can monitor a free pool and add a new range of IP addresses when the pool runs low. While manual management of free IP addresses can work in some situations, it can be time consuming, inefficient, and error prone. For example, an administrator may have to spend a significant amount of time checking free pools and adding new IP addresses when needed. If the administrator does not check a pool regularly, a pool may run out of available IP addresses, which can result in service disruption. In addition, an administrator may assign a large number of IP addresses to a particular pool in order to avoid having to check the pool frequently. However, assigning a large number of IP addresses to a particular pool can result in inefficient use of IP addresses if a large number sit in the pool unused for a long period of time.

Using the automated IP allocation techniques described herein, IP addresses can be managed and utilized efficiently. For example, ranges of IP addresses can be added to pools only when they are needed (e.g., determined automatically based on a threshold value, which can be tailored to the IP usage rate within the particular pool). In addition, the size of a range of IP addresses to be added to a particular pool can be automatically determined (e.g., based on the IP usage rate within the particular pool) to maintain efficient utilization of IP addresses. Furthermore, by automatically allocating ranges of contiguous IP addresses, fragmentation of IP addresses is reduced (e.g., saving computing resources by reducing routing complexity and reducing memory usage by not needing to store routing details for fragmented IP addresses).

Environments for Automated Allocation of IP Addresses

In any of the implementations described herein, automated allocation of IP addresses can be performed within computing environments, such as data centers. For example, ranges of contiguous IP addresses can be automatically allocated to various available IP address pools within the environment. Customer instances and/or services can then be automatically allocated IP addresses from the various available IP address pools when needed (e.g., upon instance and/or service start-up).

FIG. 1 is a diagram of an example environment 100 supporting automated allocation of IP addresses within a region 110. For example, the region 110 can include one or more data centers located in a particular geographic area, logically mapped to one or more zones. The data centers can include a collection of computing devices. The region 110 is connected to the Internet via a network connection (not depicted). Similarly, the zones can be interconnected via one or more private dedicated network links.

A common spare IP address pool 120 is associated with the region 110 (e.g., it is operated in a zone within the region). The common spare IP address pool 120 maintains a store of free IP addresses for allocation to the various sub-pools of the region 110. Specifically, in the example environment 100, the common spare IP address pool 120 provides IP addresses to zone pools (e.g., available IP address pools 152 and 162) and cross-zone pools (e.g., available IP address pools 140).

The region 110 includes a number of zones, including zone 150 and zone 160. Each zone is associated with one or more available IP address pools (e.g., customer-available IP address pools). For example zone 150 is associated with available IP address pools 152. The available IP address pools 152 can include one or more general pools for the zone 150 and/or one or more use case pools for the zone 150.

Customer instances 154 running within the zone 150 can obtain IP addresses (e.g., upon instance launch and/or at other times) from the available IP address pools 152 and/or from the available IP address pools for cross-zone use cases 140, as depicted at 170. For example, a particular customer instance can obtain an IP address from a general available IP address pool (one of the available IP address pools 152 for the zone 150) upon start-up. As another example, a particular customer instance can obtain an IP address for a particular use case (e.g., an elastic IP address) from an available IP address pool providing IP addresses for the elastic IP use case (one of the available IP address pools for cross-zone use cases 140).

Zone 160 is associated with available IP address pools 162. The available IP address pools 162 can include one or more general pools for the zone 160 and/or one or more use case pools for the zone 160. Customer instances 164 running within the zone 160 can obtain IP addresses (e.g., upon instance launch and/or at other times) from the available IP address pools 162 and/or from the available IP address pools for cross-zone use cases 140, as depicted at 170. While two zones are depicted within the region 110, a region may include any number of zones.

The available IP address pools associated with zones (e.g., available IP address pools 152 and 162) and cross-zone pools (e.g., available IP address pools 140) are also called customer-available IP address pools because they hold IP addresses that are available for allocation to customer instances (e.g., customer instances 154 and 164). In some implementations, the customer-available IP address pools provide IP addresses for allocation to services as well.

Automated allocation of IP addresses can be managed within a region by an IP allocation service. As depicted in the example environment 100, an IP allocation service 130 performs automated allocation of IP addresses within the region 110. As depicted at 132, the IP allocation service 130 performs operations for automatic IP allocation from the common spare IP address pool 120 to the available IP address pools for cross-zone use cases 140 and to the available IP address pools for the zones (available IP address pools 152 and 162).

For example, the IP allocation service 130 can monitor the available IP address pools for cross-zone use cases 140 and the available IP address pools 152 and 162. When one of the pools becomes low on IP addresses (e.g., when IP addresses in the pool fall below a threshold value), the IP allocation service 130 can obtain a range of contiguous IP addresses from the common spare IP address pool 120 and add it to the pool that is running low. For example, the IP allocation service 130 can obtain a /24 contiguous range of IP addresses and allocate the /24 contiguous range of IP addresses to one of the available IP address pools for cross-zone use cases 140.

Figure 2:
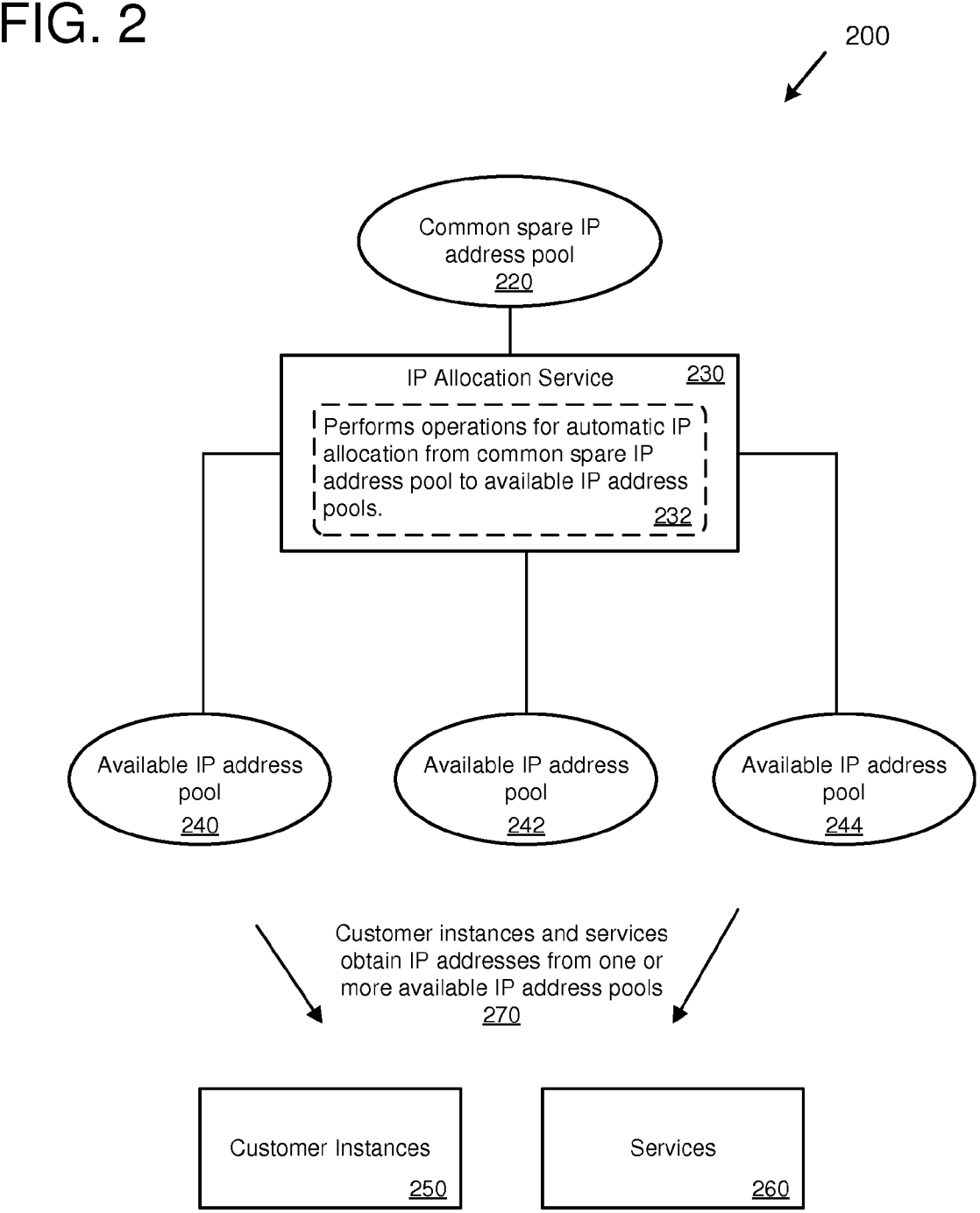
FIG. 2 is a diagram of an example environment supporting automated allocation of IP addresses to available IP address pools and to customer instances and services.

FIG. 2 is a diagram of an example environment 200 supporting automated allocation of IP addresses to available IP address pools and to customer instances and services. For example, the environment 200 can represent a collection of computing systems of a business or organization (e.g., one or more data centers or other groupings of computing systems). The environment 200 can also represent a geographical region.

A common spare IP address pool 220 maintains a store of free IP addresses for allocation to the various sub-pools of the environment 200. In the arrangement depicted in the environment 200, the common spare IP address pool 220 provides IP addresses to available IP address pools 240, 242, and 244. The available IP address pools in turn provide IP addresses to customer instances 250 and/or services 260, as depicted at 270. While three available IP address pools are depicted, the example environment 200 supports any number of available IP address pools.

Automated allocation of IP addresses can be managed within the example environment 200 by an IP allocation service 230. The IP allocation service 230 performs automated allocation of IP addresses within the example environment 200. As depicted at 232, the IP allocation service 230 performs operations for automatic IP allocation from the common spare IP address pool 220 to the available IP address pools 240, 242, and 244. The IP allocation service 230 can be implemented in software and/or hardware of one or more computing devices of the example environment 200.

For example, the IP allocation service 230 can monitor the available IP address pools 240, 242, and 244. When one of the available IP address pools becomes low on IP addresses (e.g., when IP addresses in one of the available IP address pools fall below a threshold value), the IP allocation service 230 can obtain a range of contiguous IP addresses from the common spare IP address pool 220 and add it to the available IP address pool that is running low. For example, the IP allocation service 230 can obtain a /24 contiguous range of IP addresses and allocate the /24 contiguous range of IP addresses to one of the available IP address pools (e.g., to pool 240, 242, or 244).

The available IP address pools 240, 242, and 244 can provide general IP addresses and/or use case IP addresses to customer instances 240 and/or services 250. For example, one or more of the available IP address pools can provide general purpose IP addresses while one or more other of the available IP address pools can provide IP addresses for specific use cases. In some implementations, the available IP address pools 240, 242, and 244, the customer instances 250, and the services 260 are divided into zones.

Figure 3:
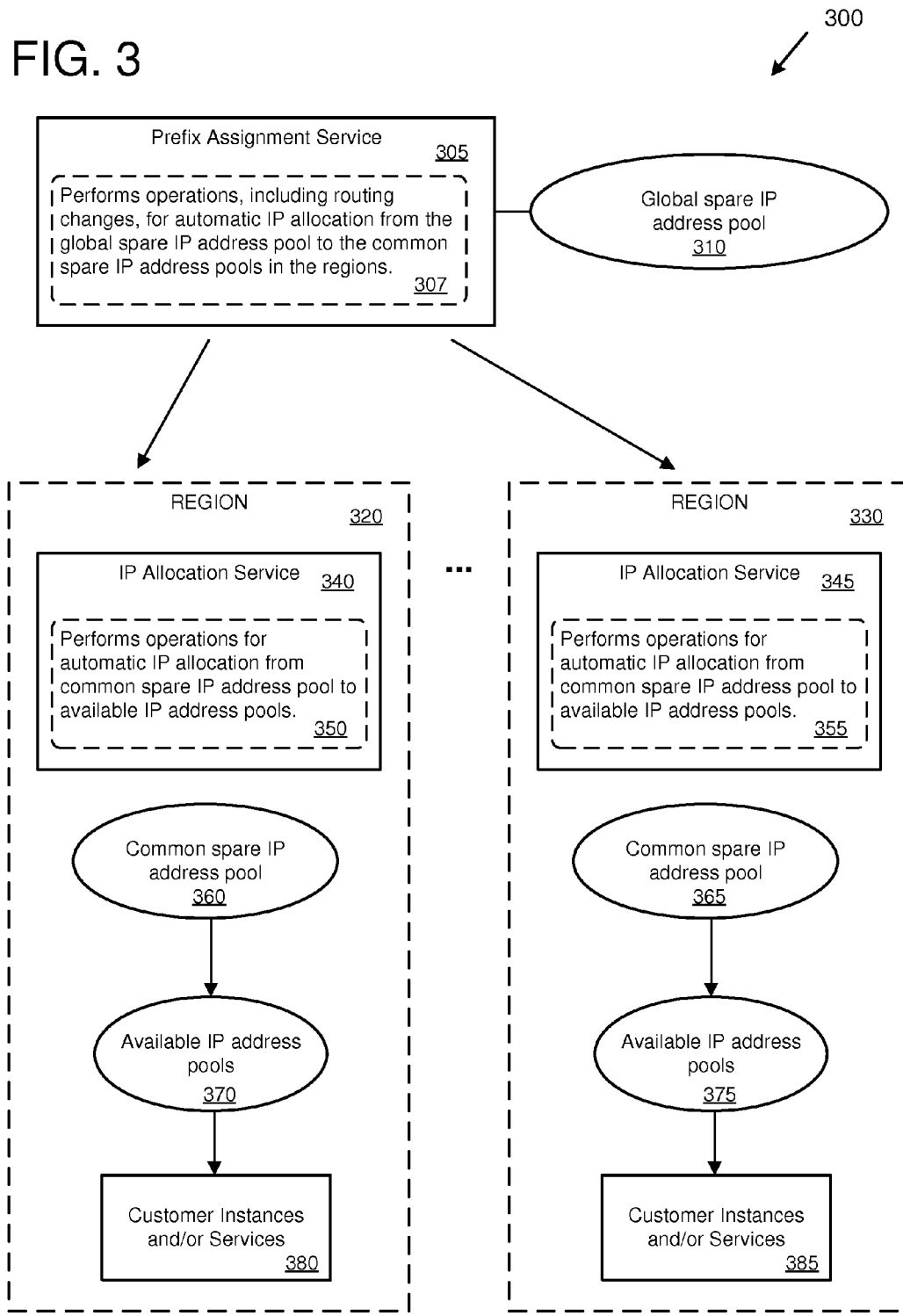
FIG. 3 is a diagram of an example environment supporting automated allocation of IP addresses from a global spare IP address pool.

FIG. 3 is a diagram of an example environment 300 supporting automated allocation of IP addresses from a global spare IP address pool to regional common spare IP address pools, and from regional common spare IP address pools to available IP address pools within a given region.

The example environment 300 can represent a business or organization that maintains computing devices in various locations (e.g., data centers in different locations). In some implementations, the example environment 300 represents a cloud computing service provider that maintains data centers providing cloud computing services in different geographical regions.

As depicted in the example environment 300, a global spare IP address pool 310 maintains a store of free IP addresses for allocation to common spare IP address pools located in various regions, including common spare IP address pool 360 in region 320 and common spare IP address pool 365 in region 330. While two regions are depicted (320 and 330), any number of regions can be supported within the example environment 300.

The common spare IP address pools maintain stores of free IP addresses for allocation to the various sub-pools in their respective regions. For example, within region 320 common spare IP address pool 360 provides IP addresses to one or more available IP address pools 370 and within region 330 common spare IP address pool 365 provides IP addresses to one or more available IP address pools 375.

The available IP address pools in turn provide IP addresses to customer instances and/or services in their respective regions. For example, within region 320 available IP address pools 370 provide IP addresses for allocation to customer instances and or services 380, and within region 330 available IP address pools 375 provide IP addresses for allocation to customer instances and or services 385.

Automated allocation of IP addresses can be managed within the example environment by various services, including a prefix assignment service 305 that manages allocation of IP addresses from the global spare IP address pool 310 to the common spare IP address pools in the various regions (e.g., regions 320 and 330), as depicted at 307. For example, the prefix assignment service 305 can initiate a procedure for advertising a route to the Internet to direct a range of IP addresses that is being allocated from the global spare IP address pool 310 to a particular common spare IP address pool (e.g., to common spare IP address pool 360 in region 320).

The prefix assignment service 305 performs or initiates a number of routing-related operations when allocating IP addresses from the global spare IP address pool 310 to a common spare IP address pool in a region. The routing-related operations can include updating border gateway protocol (BGP) routes so that the prefix (the network address portion of the range of IP addresses being allocated) is advertised out of the correct region (the region to which the IP addresses are being allocated). The routing-related operations can include registering the prefix with geo-location services (e.g., with one or more IP geo-location services or databases). The routing-related operations can include registering the prefix with the appropriate oversight authority (e.g., the American Registry for Internet Numbers (ARIN) for North America). The routing-related operations can include updating domain name system (DNS) records. The routing-related operations can also include notifying customers that a new prefix has been added to a particular region (e.g., so that customers can update white lists and/or black lists).

As depicted, an IP allocation service within each region performs automated allocation of IP addresses within its respective region. Specifically, IP allocation service 340 performs automated allocation of IP addresses within region 320. As depicted at 350, IP allocation service 340 performs operations for automatic IP allocation from the common spare IP address pool 360 to the available IP address pools 370 (e.g., when the number of free IP addresses in one of the available IP address pools 370 falls below a threshold value). The IP allocation service 340 can also perform operations for automatically assigning IP addresses from the available IP address pools 370 to the customer instances and/or services 380, and for handling IP addresses that are released from the customer instances and/or services 380. The IP allocation service 340 can also participate in automatic IP allocation from the global spare IP address pool 310 to the common spare IP address pool 360 (e.g., when the number of free IP addresses in the common spare IP address pool 360 falls below a threshold value). For example, the IP allocation service 340 can receive a range of contiguous IP addresses from the prefix assignment service 305 and add it to the common spare IP address pool 360. The IP allocation services for other regions perform these operations for their respective regions (e.g., IP allocation service 345 performs automated allocation of IP addresses within region 330, including the operations depicted at 355).

In some implementations, no Internet routing changes are needed when automatically allocating ranges of contiguous IP addresses to available IP address pools (e.g., to customer-available IP address pools). For example, IP addresses stored within a common spare IP address pool can be routed via the Internet to a specific geographical region of a business or organization (e.g., a specific data center or other group of computing systems). When a range of contiguous IP addresses is allocated from the common spare IP address pool to an available IP address pool within the geographical region, Internet routing can remain the same (e.g., routes to the range of contiguous IP addresses can still direct traffic to the geographical region). However, depending on networking details of the region, internal or local routing may need to be adjusted (e.g., local routing managed by the business or organization within the region).

In some implementations, Internet routing changes are needed when automatically allocating contiguous ranges of IP addresses from a global spare IP address pool to a common spare IP address pool. For example, when a range of contiguous IP addresses is allocated from the global spare IP address pool to a common spare IP address pool in a particular geographical region, Internet routing may need to be changed to direct network traffic for the range of contiguous IP addresses to the particular geographical region.

In some implementations, customer instances and/or services obtain single IP addresses from an available IP address pool. In some implementations, customer instances and/or services can also obtain a block of IP addresses (e.g., a contiguous block, such as 8 or 16 IP addresses) from an available IP address pool. In some implementations, IP addresses in an available IP address pool are segmented into at least a first group from which individual IP addresses are allocated to customer instances and/or services and a second group from which blocks of contiguous IP addresses are allocated to customer instances and/or services. By maintaining two separate groups (one for individual IPs and one for blocks of IPs), fragmentation can be reduced. For example, blocks of contiguous IPs can be allocated from a specific group of IPs in an available IP address pool and released back to the same group without being fragmented.

Automated Allocation of IP Addresses

In any of the implementations described herein, ranges of contiguous IP addresses can be automatically added to a pool of IP addresses (e.g., a customer-available IP address pool, an available IP address pool, and/or other types of pools that store free IP addresses) when the pool runs low. In order to determine when to automatically add a range of contiguous IP addresses to a pool, a threshold value can be determined. When available IP addresses in the pool fall below the threshold value, another range of contiguous IP addresses can be added.

In some implementations, the threshold value for a particular pool is determined based at least in part on a historical allocation rate from the pool and a historical release rate back to the pool. The historical allocation rate for IP addresses from the pool (e.g., an available IP address pool) indicates the rate at which IP addresses are allocated from the pool (e.g., the number of IP addresses that are assigned to customer instances and/or services per day). The historical release rate for IP addresses back to the pool (e.g., an available IP address pool) indicates the rate at which IP addresses are released and added back to the pool (e.g., the number of IP addresses that are released by customer instances and/or services and returned to the pool per day). The historical rates can be determined by monitoring (e.g., by an IP allocation service) allocation and release rates over a period of time, such as a week or month.

Depending at least in part on the historical allocation rate and the historical release rate for a particular pool, a threshold value can be determined. For example, if the historical allocation rate for a particular pool is large compared to the historical release rate, then the threshold value can be set relatively high to ensure that enough IP addresses will be available in the pool to satisfy the relatively large demand for a period of time. However, if the historical allocation rate for a particular pool is only slightly higher than the historical release rate, then the threshold value can be set relatively low.

In some implementations, released IP addresses are not added back to a pool (e.g., to an available IP address pool) for an amount of time specified by a no-reuse window value. For example, if the no-reuse window value is set to 24 hours, then an IP address that is released (e.g., by a customer instance or a service) will not be available for allocation to another customer instance or another service for 24 hours (e.g., the released IP address is not added back to the available IP address pool). In some implementations, the no-reuse window provides an opportunity for the customer or service to reclaim the released IP address during the no-reuse window time period (e.g., the IP address may have been mistakenly released by a customer operating a virtual machine instance). Implementing a no-reuse window can protect a customer from others whose use (intentional or unintentional) of the released IP address could reflect negatively on the customer. For example, if someone obtains the released IP address and implements a denial of service attack, such an attack could be attributed to the customer if a sufficient amount of time has not elapsed since the IP address was released.

In some implementations, the threshold value for a particular pool is automatically determined such that the pool has sufficient IP addresses to last a specific amount of time (e.g., pre-determined number of days). For example, if IP addresses are being allocated from the pool at a rate of 1,000 per day and released to the pool at a rate of 500 per day, and a setting for the pool indicates that the pool should have 5 days of available IP addresses, then the threshold value can be set to 2,500 IP addresses.

In some implementations, the threshold value that is determined for a particular pool represents a number of days of coverage for the pool (i.e., a number of free IP addresses in the pool that is expected to last for the number of days if no new IP addresses are added to the pool) based on the specific allocation rate and release rate for the particular pool. For example, the number of days of coverage could be 10 days. In a specific implementation, the threshold value is calculated using the following equation (Equation 1):

Number of free IPs in pool=(allocation rate−release rate)*desired coverage

According to Equation 1, the threshold value specifies a minimum number of free IPs in the pool and is calculated based on the difference between the historical allocation rate and the historical release rate for the pool multiplied by the number of days of desired coverage. For example, if the historical allocation rate is 1,000 IPs/day and the historical release rate is 500 IPs/day and the desired coverage is 10 days, then the threshold value would be 5,000 IPs.

In some implementations, Equation 1 above is modified to include a buffer period. The buffer period operates to increase the number of free IPs in the pool to by taking the no-reuse window into account. In a specific implementation, the threshold value is calculated using the following equation (Equation 2):

Number of free IPs in pool=(allocation rate−release rate)*desired coverage+releases rate*no-reuse window According to Equation 2, the value calculated in Equation 1 above is increased by the historical release rate multiplied by the no-reuse window (in days). For example, if the historical allocation rate is 1,000 IPs/day, the historical release rate is 500 IPs/day, the desired coverage is 10 days, and the no-reuse window is 1 day (24 hours), then the threshold value would be 5,500 IPs.

In some implementations, the threshold value can be increased to take into account allocation spikes. For example, if a particular pool experiences large spikes (e.g., days in which the allocation rate is ten times the average allocation rate), then the threshold value can be increased. In some implementations, the threshold value is increased by increasing the desired coverage (e.g., from 10 days to 15 days). In other implementations, the threshold value is increased by a spike amount. For example, Equation 1 or Equation 2 above can be modified by adding the highest allocation day in the past month (or other historical time period).

In some implementations, the rate of IP address utilization is used to determine IP address allocation size. For example, if the allocation rate (e.g., the ratio or difference between the historical allocation rate and the historical release rate) for a particular pool is high, then a larger range of contiguous IP addresses can be allocated when the pool falls below the threshold value (e.g., a /22 range of IPv4 addresses may be allocated to an available IP address pool instead of a /24 range of IPv4 addresses). On the other hand, if the allocation rate for a particular pool is low, then a smaller range of contiguous IP addresses can be allocated when the pool falls below the threshold value.

Methods for Automated Allocation of IP Addresses

In any of the technologies described herein, methods can be provided for automated allocation of IP addresses. For example, automated allocation of IP addresses can be provided within a geographical region.

Figure 4:
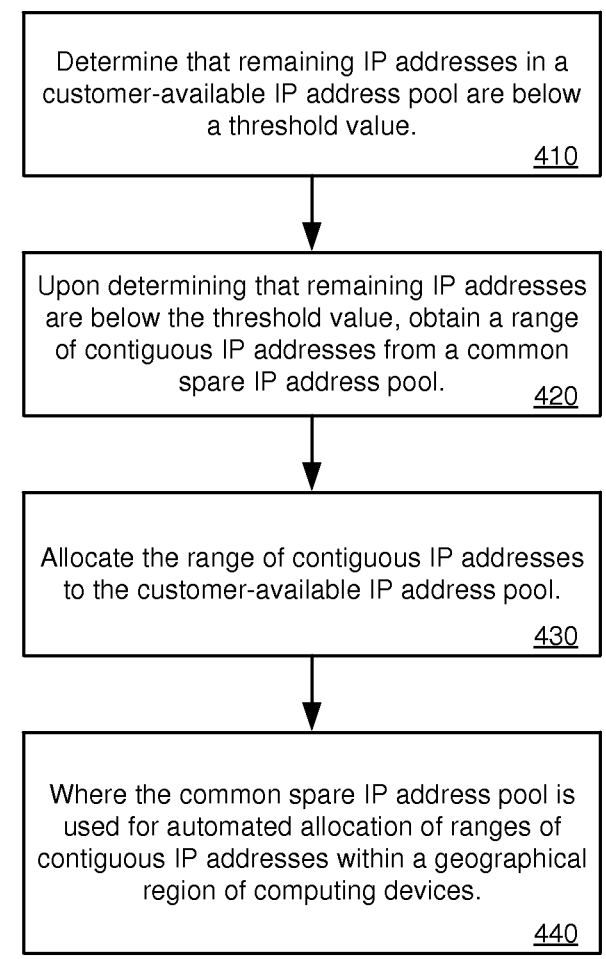
FIG. 4 is a flowchart of an example method for performing automated allocation of IP addresses within a region.

FIG. 4 is a flow chart of an example method 400 for performing automated allocation of IP addresses within a region. The IP addresses allocated by the example method 400 are public IP addresses that are routable via the Internet. The example method 400 can be performed by an IP allocation service, such as IP allocation service 130 running within region 110.

At 410, it is determined that remaining IP addresses in a customer-available IP address pool are below a threshold value. The remaining IP addresses in a customer-available IP address pool are the IP addresses that are available in the IP address pool for allocation (e.g., IP addresses that are currently unused and therefore available for allocation to customer instances). In order to make the determination, the customer-available IP address pool can be monitored periodically (e.g., very five minutes, every hour, or every day) or checked upon the occurrence of a particular event (e.g., checked when an IP address is allocated from the customer-available IP address pool to a customer instance). The customer-available IP address pool can be monitored or checked by an IP allocation service. The customer-available IP address pool provides IP addresses to customer instances (also called customer virtual machine instances).

Upon determining that remaining IP addresses in the customer-available IP address pool are below the threshold value, the operations depicted at 420 and 430 are performed. Specifically, at 420, a range of contiguous IP addresses are obtained from a common spare IP address pool. For example, range of contiguous IP addresses could be a /24 range of IP addresses.

At 430, the range of contiguous IP addresses (obtained at 420) is allocated to the customer-available IP address pool. For example, the /24 range of IP addresses can be added to the customer-available IP address pool.

As indicated at 440, the common spare IP address pool is used for automated allocation of ranges of contiguous IP addresses within a geographical region of computing devices. In addition, the example method 400 can be used to automatically allocate contiguous IP ranges from the common spare IP address pool to a plurality of customer-available IP address pools, including the customer-available IP address pool.

Figure 5:
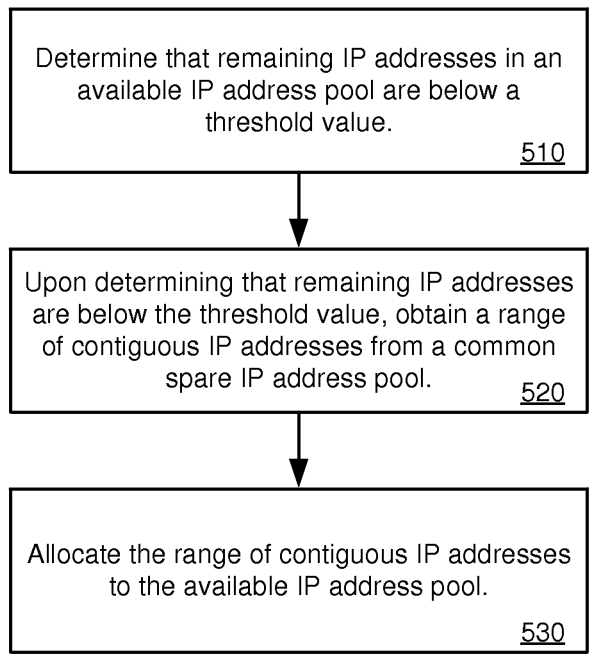
FIG. 5 is a flowchart of an example method for performing automated allocation of IP addresses from a common spare IP address pool.

FIG. 5 is a flow chart of an example method 500 for performing automated allocation of IP addresses from a common spare IP address pool. For example, the example method 500 can be performed by an IP allocation service, such as IP allocation service 230. The IP addresses allocated by the example method 500 are public IP addresses that are routable via the Internet.

At 510, it is determined that remaining IP addresses in an available IP address pool are below a threshold value. The remaining IP addresses in an available IP address pool are the IP addresses that are currently available in the available IP address pool for allocation (e.g., IP addresses that are currently unused and therefore available for allocation to customer instances or services). In order to make the determination, the available IP address pool can be monitored periodically (e.g., very five minutes, every hour, or every day) or checked upon the occurrence of a particular event (e.g., checked when an IP address is allocated from the available IP address pool to a customer instance or a service). The available IP address pool can be monitored or checked by an IP allocation service. The available IP address pool provides IP addresses to devices and/or services. For example, the available IP address pool can provide IP addresses for assignment to customer instances (also called customer virtual machine instances) and/or other types of computing services (e.g., networking services).

Upon determining that remaining IP addresses in the available IP address pool are below the threshold value, the operations depicted at 520 and 530 are performed. Specifically, at 520, a range of contiguous IP addresses is obtained from a common spare IP address pool. For example, the range of contiguous IP addresses could be a /24 range of IP addresses.

At 530, the range of contiguous IP addresses (obtained at 520) is allocated to the available IP address pool. For example, the /24 range of IP addresses can be added to the available IP address pool.

The example method 500 can be used to automatically allocate ranges of contiguous IP addresses from the common spare IP address pool to a number of available IP address pools (e.g., available address pools associated with particular zones and/or use cases). The example method 500 can automatically allocate ranges of contiguous IP addresses among a collection of computing devices, such as a collection of computing devices located at a particular data center.

Figure 6:
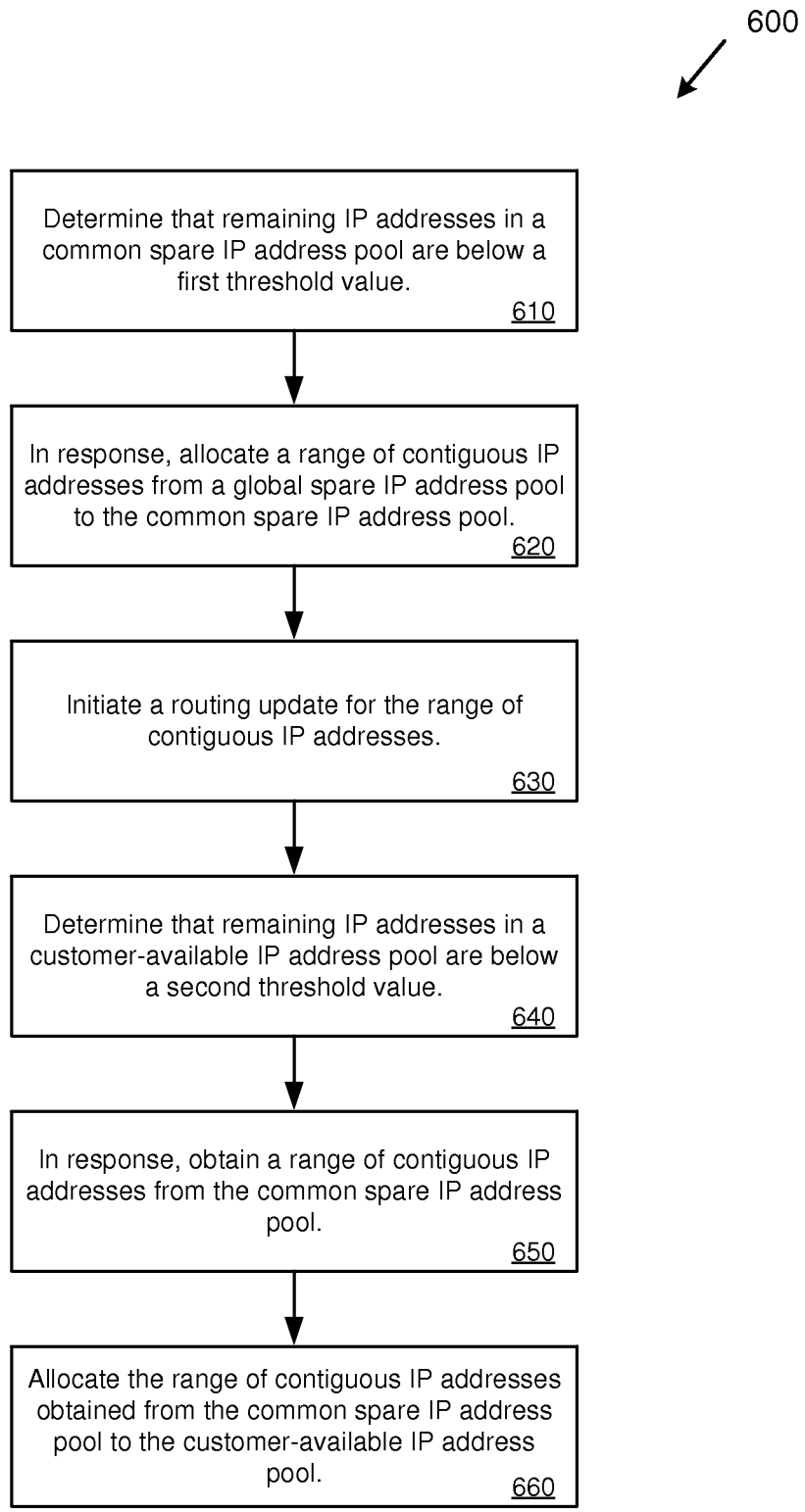
FIG. 6 is a flowchart of an example method for performing automated allocation of IP addresses from a global spare IP address pool.

FIG. 6 is a flow chart of an example method 600 for performing automated allocation of IP addresses from a global spare IP address pool. The IP addresses allocated by the example method 600 are public IP addresses that are routable via the Internet. For example, the example method 600 can be performed by various services that manage automated allocation of IP addresses, such as prefix assignment service 305 and IP allocation services 340 and 345.

At 610, it is determined that remaining IP addresses in a common spare IP address pool are below a first threshold value. The remaining IP addresses in a common spare IP address pool are the IP addresses that are currently available in the common spare IP address pool for allocation (e.g., IP addresses that are currently unused and therefore available for allocation to available IP address pools). In order to make the determination, the common spare IP address pool can be monitored periodically (e.g., very five minutes, every hour, or every day) or checked upon the occurrence of a particular event (e.g., checked when ranges of IP addresses are allocated to sub-pools). The common spare IP address pool can be monitored or checked by an IP allocation service.

At 620, in response to determining that the remaining IP addresses in the common spare IP address pool are below the first threshold value, a range of contiguous IP addresses are allocated from a global spare IP address pool to the common spare IP address pool.

At 630, a routing update is initiated to directing traffic for the range of contiguous IP addresses to a location (e.g., a region) associated with the common spare IP address pool. For example, the routing update can comprise one or more routing-related operations, such as updates to BGP routes, registration with geo-location services, registration with oversight authorities, DNS updates, and/or notifications to customers. The routing update can be initiated by a service, such as the prefix assignment service 305.

At 640, it is determined that remaining IP addresses in an available IP address pool are below a second threshold value. The remaining IP addresses in an available IP address pool are the IP addresses that are currently available in the available IP address pool for allocation (e.g., IP addresses that are currently unused and therefore available for allocation to customer instances or services). In order to make the determination, the available IP address pool can be monitored periodically (e.g., very five minutes, every hour, or every day) or checked upon the occurrence of a particular event (e.g., checked when an IP address is allocated from the available IP address pool to a customer instance or a service). The available IP address pool can be monitored or checked by the IP allocation service. The available IP address pool provides IP addresses to devices and/or services. For example, the available IP address pool can provide IP addresses for assignment to customer instances (also called customer virtual machine instances) and/or other types of computing services (e.g., networking services).

In response to determining that remaining IP addresses in the available IP address pool are below the second threshold value, the operations depicted at 650 and 660 are performed. Specifically, at 650, a range of contiguous IP addresses is obtained from the common spare IP address pool. For example, a range of contiguous IP addresses could be a /24 range of IP addresses.

At 660, the range of contiguous IP addresses (obtained at 650) is allocated to the available IP address pool. For example, the /24 range of IP addresses can be added to the available IP address pool.

The example method 600 can be used to automatically allocate ranges of contiguous IP addresses from the global spare IP address pool to a number of common spare IP address pools (e.g., where each of the common spare IP address pool serves a collection of computing devices, such as a data center or region). Each common spare IP address pool can then provide IP addresses for automatic allocation to its associated available IP address pools.

In the example method 600, the first threshold value can be automatically calculated from usage statistics of the common spare IP address pool (e.g., historical allocation and release rates for the common spare IP address pool). The second threshold value can be automatically calculated from usage statistics of the available IP address pool (e.g., historical allocation and release rates for the available spare IP address pool).

Example Service Provider Environments

Figure 7:
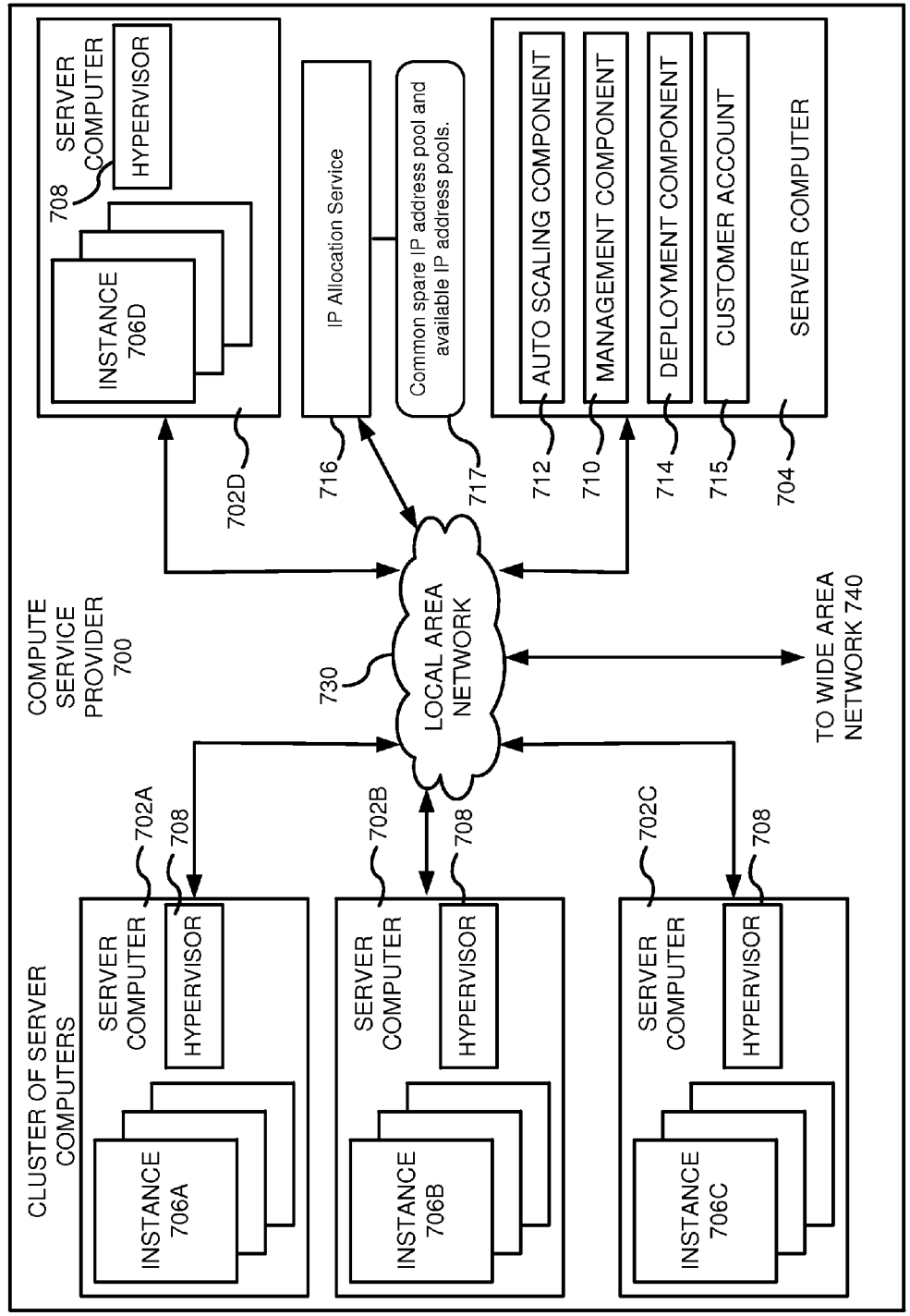
FIG. 7 is an example system diagram showing a plurality of virtual machine instances running in a multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example, each of the servers 702A-702D can be configured to execute a hypervisor 708 or another type of program configured to enable the execution of multiple instances 706 on a single server. For example, each of the servers 702A-702D can be configured (e.g., via the hypervisor 708) to support one or more virtual machine slots, with each virtual machine slot capable of running a virtual machine instance (e.g., server computer 702A could be configured to support three virtual machine slots each running a corresponding virtual machine instance). Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and networking devices can be utilized to interconnect the various computing systems disclosed herein.

In some implementations, an IP allocation service 716 provides for automated allocation of IP addresses within the local area network 730. For example, the IP allocation service 716 can manage IP address pools 717 (including a common spare IP address pool and available address pools). For example, the IP allocation service 716 can allocate ranges of contiguous IP addresses from the common spare IP address pool to the available IP address pools when available IP addresses fall below a threshold amount. The IP allocation service 716 can also receive requests from the various devices and services of the local area network 730 and provide IP addresses from the available IP address pools. For example, the IP allocation service 716 can receive a request when a new customer instance launches (e.g., one of the instances 706A) and provide an IP address form one of the available IP address pools in response for the new customer instance to use. The IP allocation service 716 can also receive IP addresses that have been released by customer instances (e.g., upon instance shutdown) and return them to an available IP address pool (e.g., after a no-reuse window time period has expired).

Figure 8:
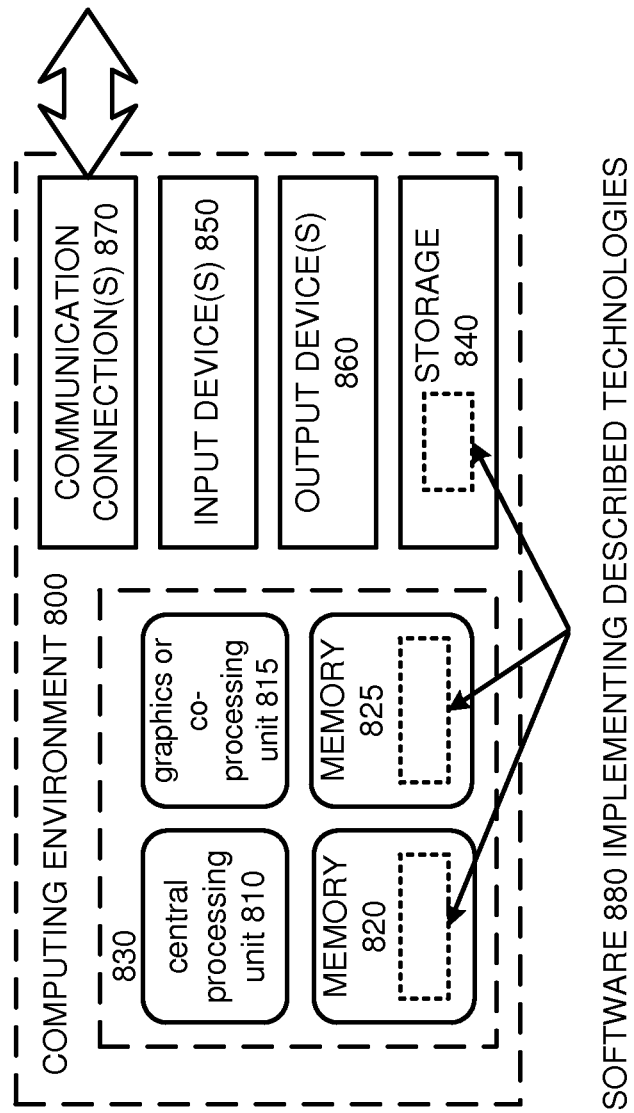
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a computing device, for performing automated allocation of Internet Protocol (IP) addresses, the method comprising:
   determining, by the computing device comprising a processing unit and memory, that remaining IP addresses which are available for allocation in a customer-available IP address pool are below a threshold value; and
   upon determining that the remaining IP addresses are below the threshold value:
      obtaining, by the computing device from a data store that stores a common spare IP address pool, a range of contiguous IP addresses from the common spare IP address pool; and
      allocating, by the computing device to a data store that stores the customer-available IP address pool, the range of contiguous IP addresses obtained from the common spare IP address pool to the customer-available IP address pool;
   wherein the common spare IP address pool is used for automated allocation of ranges of contiguous IP addresses within a geographical region of computing devices;
   wherein the common spare IP address pool contains public IP addresses that are routable via the Internet; and
   wherein contiguous IP ranges are automatically allocated from the common spare IP address pool to a plurality of customer-available IP address pools, including the customer-available IP address pool, and wherein customer instances obtain IP addresses from the customer-available IP address pools.

2. The method of claim 1 wherein the plurality of customer-available IP address pools include one or more of the following pool types:
   a customer-available IP address pool that provides IP addresses for a particular zone;
   a customer-available IP address pool that provides IP addresses for a particular use case within a particular zone; or
   a customer-available IP address pool that provides IP addresses for a particular use case across a plurality of zones.

3. The method of claim 1 wherein the threshold value is determined, at least in part, using:
   a historical allocation rate for IP addresses from the customer-available IP address pool; and
   a historical release rate for IP addresses back to the customer-available IP address pool.

4. The method of claim 1 wherein the determining that remaining IP addresses in a customer-available IP address pool are below a threshold value comprises:
   determining a historical allocation rate for IP addresses from the customer-available IP address pool;
   determining a historical release rate for IP addresses back to the customer-available IP address pool;
   obtaining a no-reuse window value;
   obtaining a desired coverage value; and
   calculating the threshold value using at least the historical allocation rate, the historical release rate, the no-reuse window value, and the desired coverage value.

5. The method of claim 1 further comprising:
   receiving one or more IP addresses released by a customer instance;
   obtaining a no-reuse window value; and
   adding the one or more IP addresses released by the customer instance to the customer-available IP address pool after a length of time specified by the no-reuse window value;
   wherein the one or more IP addresses released by the customer instance are not available for re-allocation to a different customer until the length of time has expired.

6. The method of claim 1 further comprising:
   receiving a request to allocate an IP address for a customer instance;
   obtaining an IP address from the customer-available IP address pool; and
   allocating the obtained IP address to the customer instance.

7. A computing device comprising:
   one or more processing units;
   wherein the computing device is configured to perform operations for automated allocation of Internet Protocol (IP) addresses, the operations comprising:
      determining that remaining IP addresses in an available IP address pool are below a threshold value, wherein the threshold value is determined, at least in part, using:
         a historical allocation rate for IP addresses from the available IP address pool; and
         a historical release rate for IP addresses back to the available IP address pool; and
      upon determining that the remaining IP addresses are below the threshold value:
         obtaining, from a data store that stores a common spare IP address pool, a range of contiguous IP addresses from the common spare IP address pool; and
         allocating, to a data store that stores the available IP address pool, the range of contiguous IP addresses obtained from the common spare IP address pool to the available IP address pool;
      wherein the common spare IP address pool is used for automated allocation of ranges of contiguous IP addresses within a geographical region of computing devices.

8. The computing device of claim 7 further comprising:
   receiving a request, from a customer instance or a service, to allocate an IP address from the available IP address pool;
   in response to the request:
      obtaining an IP address from the available IP address pool; and
      allocating the obtained IP address to the customer instance or service.

9. The computing device of claim 7 further comprising:
   receiving one or more IP addresses released by a customer instance or a service;
   obtaining a no-reuse window value; and
   adding the one or more IP addresses released by the customer instance or the service to the available IP address pool after a length of time specified by the no-reuse window value;
   wherein the one or more IP addresses released by the customer instance or the service are not available for re-allocation to a different customer or a different service until the length of time has expired.

10. The computing device of claim 7 wherein the remaining IP addresses in the available IP address pool are segmented into groups comprising:

a first group from which customer instances or services allocate individual IP addresses; and a second group from which customer services or instances allocation blocks of contiguous IP addresses.

11. The computing device of claim 7 wherein the determining that remaining IP addresses in an available IP address pool are below a threshold value further comprises:
   obtaining a no-reuse window value;
   obtaining a desired coverage value; and
   calculating the threshold value using at least the historical allocation rate, the historical release rate, the no-reuse window value, and the desired coverage value.

12. The computing device of claim 7 wherein contiguous IP ranges are automatically allocated from the common spare IP address pool to a plurality of available IP address pools, including the available IP address pool, and wherein customer instances obtain IP addresses from the available IP address pool when needed and release IP address back to the available IP address pool when not needed.

13. The computing device of claim 12 wherein each available IP address pool of the plurality of available IP address pools is of one of the following pool types:
   an available IP address pool that provides IP addresses for a particular zone;
   an available IP address pool that provides IP addresses for a particular use case within a particular zone; or
   an available IP address pool that provides IP addresses for a particular use case across a plurality of zones.

14. The computing device of claim 7 wherein the operations for automated allocation of IP addresses are performed by an IP allocation service running on the computing device that monitors the available IP address pool and allocates ranges of contiguous IP addresses from the common spare IP address pool when needed for the geographical region of computing devices that provide cloud computing services.

15. A non-transitory computer-readable storage medium storing computer-executable instructions for causing a computing device comprising to perform for performing automated allocation of Internet Protocol (IP) addresses, the operations comprising:
   determining that remaining IP addresses in a common spare IP address pool are below a first threshold value, wherein the common spare IP address pool services a region; and
   upon determining that the remaining IP addresses in the common spare IP address pool are below the first threshold value, allocating a range of contiguous IP addresses from a global spare IP address pool to a data store storing the common spare IP address pool;
   initiating a routing update to directing traffic for the range of contiguous IP addresses to the region serviced by the common spare IP address pool;
   determining that remaining IP addresses in an available IP address pool are below a second threshold value; and
   upon determining that the remaining IP addresses in the available IP address pool are below the second threshold value:
      obtaining a range of contiguous IP addresses from the data store storing the common spare IP address pool; and
      allocating the range of contiguous IP addresses obtained from the common spare IP address pool to a data store storing the available IP address pool.

16. The computer-readable storage medium of claim 15, wherein the global spare IP address pool is used for automated allocation of ranges of contiguous IP addresses among a plurality of common spare IP address pools, including the common spare IP address pool, for a plurality of corresponding regions.

17. The computer-readable storage medium of claim 16, wherein each region of the plurality of regions contains:
   the common spare IP address pool for the region; and
   a plurality of available IP address pools for the region;
   wherein customer instances running within the region obtain IP addresses from the plurality of available IP address pools for the region.

18. The computer-readable storage medium of claim 15, further comprising:
   receiving one or more IP addresses released by a customer instance or a service;
   obtaining a no-reuse window value; and
   adding the one or more IP addresses released by the customer instance or the service to the available IP address pool after a length of time specified by the no-reuse window value;
   wherein the one or more IP addresses released by the customer instance or the service are not available for re-allocation to a different customer or a different service until the length of time has expired.

19. The computer-readable storage medium of claim 15, wherein the second threshold value is determined, at least in part, using:
   a historical allocation rate for IP addresses from the available IP address pool; and
   a historical release rate for IP addresses back to the available IP address pool.

20. The computer-readable storage medium of claim 15, wherein the determining that remaining IP addresses in an available IP address pool are below a second threshold value comprises:
   determining a historical allocation rate for IP addresses from the available IP address pool;
   determining a historical release rate for IP addresses back to the available IP address pool;
   obtaining a no-reuse window value;
   obtaining a desired coverage value; and
   calculating the second threshold value using at least the historical allocation rate, the historical release rate, the no-reuse window value, and the desired coverage value.

* * * * *